United States Patent [19]
Foreman et al.

[11] Patent Number: 6,084,001
[45] Date of Patent: *Jul. 4, 2000

[54] HIGH BUILD POLYURETHANE COATING

[75] Inventors: James E. Foreman; Douglas R. Dowell, both of Orlando; Bobby G. Isler, Lady Lake, all of Fla.

[73] Assignee: Lockheed Martin Corporation, Bethesda, Md.

[ * ] Notice: This patent issued on a continued prosecution application filed under 37 CFR 1.53(d), and is subject to the twenty year patent term provisions of 35 U.S.C. 154(a)(2).

[21] Appl. No.: 08/635,176

[22] Filed: Apr. 25, 1996

[51] Int. Cl.$^7$ ........................................................ C08J 9/00
[52] U.S. Cl. ............................ 521/79; 521/163; 521/164; 521/167
[58] Field of Search .............................. 521/79, 163, 164, 521/167

[56] References Cited

U.S. PATENT DOCUMENTS

| | | |
|---|---|---|
| 3,036,022 | 5/1962 | Stewart et al. . |
| 3,067,149 | 12/1962 | Dombrow et al. . |
| 3,905,925 | 9/1975 | Vervloet . |
| 4,092,286 | 5/1978 | Noll et al. . |
| 4,104,236 | 8/1978 | Simroth . |
| 4,288,564 | 9/1981 | Conover et al. . |
| 4,303,774 | 12/1981 | Nachtkamp et al. . |
| 4,442,235 | 4/1984 | Taylor et al. . |
| 4,507,336 | 3/1985 | Cenegy . |
| 4,584,325 | 4/1986 | Smith . |
| 4,595,741 | 6/1986 | Kamatani et al. . |
| 4,738,989 | 4/1988 | Smith . |
| 4,748,192 | 5/1988 | Smith . |
| 4,748,201 | 5/1988 | Smith . |
| 4,868,225 | 9/1989 | Sun . |
| 5,008,297 | 4/1991 | Maruyama . |
| 5,120,771 | 6/1992 | Walmsley . |
| 5,171,818 | 12/1992 | Wilson . |
| 5,189,075 | 2/1993 | Zimmerman et al. . |
| 5,223,547 | 6/1993 | Harada et al. . |

*Primary Examiner*—Helen L. Pezzuto
*Attorney, Agent, or Firm*—Burns, Doane, Swecker & Mathis, LLP

[57] ABSTRACT

An improved durable, low density, high build polyurethane coating is disclosed, as well as its method of manufacture. A slow reacting polyisocyanate is combined with a polyol so as to form a uniform mixture with an extremely long pot life. The low viscosity uniform mixture can then be sprayed onto a substrate using a conventional spray gun. A polyurethane catalyst is introduced after formation of the uniform mixture, preferably via a second spray nozzle so that catalyst is externally mixed into the polyisocyanate/polyol spray stream. This is a 100%, or near 100%, solids system so that there is very low volatile organic compound emissions.

20 Claims, 1 Drawing Sheet

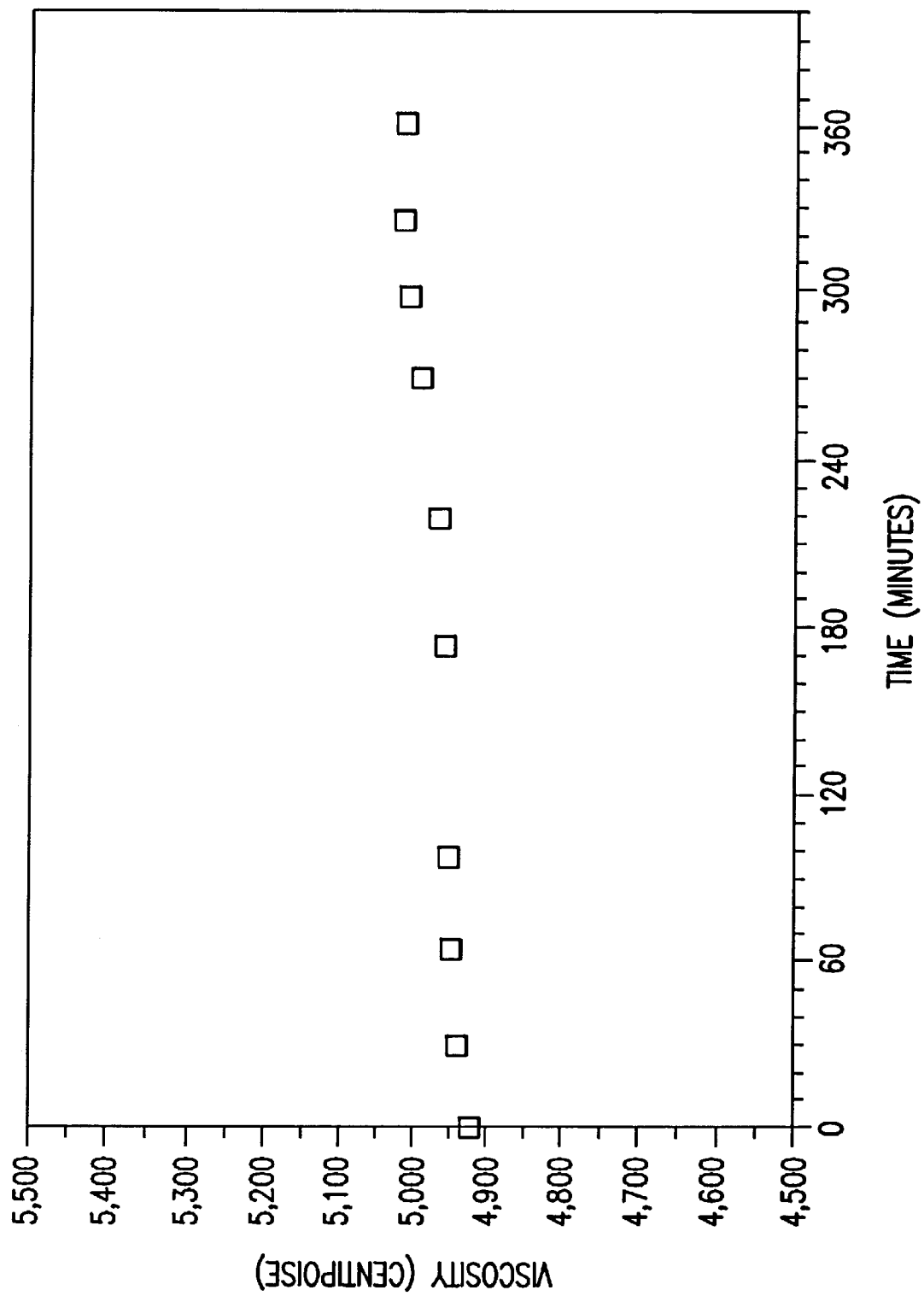

HIGH BUILD POLYURETHANE COATING

BACKGROUND OF THE INVENTION

1. Field of the Invention

The present invention relates to sprayable polyurethane compositions and to methods for coating surfaces with such compositions. In particular, the polyurethane coating of the invention is low density, durable, and has a thickness greater than that achievable with previous polyurethane coatings.

2. Description of the Related Art

A durable, low density, thick, high build rate coating with low volatile organic compound (VOC) emissions has been desired as a protective coating for many years. Attempts at producing a coating having those characteristics has resulted in compromising one or several of the desired properties. When low density coatings are fabricated they tend to have low toughness or abrasion resistance. Furthermore, most low density coatings require a significant amount of organic solvent to carry the coating during spraying applications, which contributes significantly to the problem of VOC emissions. Thick coatings tend to be spongy or brittle and applying that type of coating to a vertical surface is a slow and tedious process due to slumping problems or curing/out gassing times required. The majority of low VOC coatings available at the present time are only acceptable for thin coating applications (less than 20 mils dry film thickness), or have an exceedingly long dry time between applications which prohibits the successful fabrication of high build rate and/or thick coatings.

These and other material and process problems associated with thick, durable, low density coatings necessitated the development of a low VOC coating that could be applied by a conventional spraying method.

OBJECTS AND SUMMARY OF THE INVENTION

It is therefore a general object of the present invention to provide an improved durable, low density, thick, high build rate polyurethane coating. The polyurethane coating preferably also has low VOC emissions.

It is a more specific object of the present invention to provide a durable, low density, high build polyurethane coating which is capable of having a thickness greater than 0.100 inches when applied during a single application.

It is another object of the invention to provide a durable, low density, high build polyurethane coating which is capable of having a thickness greater than 0.030 inches when applied during a single application to a vertical surface.

It is yet another object of the present invention to provide a method for producing a durable, low density, hitch build polyurethane coating comprising:

(a) mixing at least one polyol and at least one polyisocyanate so as to provide a uniform mixture in which the polyol and polyisocyanate have not substantially reacted to form a urethane and which has sufficiently low viscosity such that the mixture is capable of being sprayed, (b) introducing a catalytically effective amount of at least one polyurethane catalyst, and (c) spraying the mixture onto a substrate so as to form a polyurethane coating thereon.

BRIEF DESCRIPTION OF THE DRAWINGS

FIG. 1 illustrates the change in viscosity versus pot life for a uniform polyisocyanate/polyol mixture according to the invention.

DETAILED DESCRIPTION OF THE PREFERRED EMBODIMENTS

The present invention provides a sprayable polyurethane coating composition. The polyurethane coating composition of the present invention is prepared by mixing a slow reacting polyisocyanate with a polyol to provide a uniform mixture. A polyurethane catalyst is introduced into the uniform polyisocyanate/polyol mixture, and the mixture is sprayed onto a substrate so as to form a polyurethane coating on the substrate.

The slow reacting polyisocyanates of the invention are compounds having two or more reactive isocyanate moieties. The slow reacting polyisocyanates are typically aliphatic or cycloaliphatic, and include isophorone diisocyanate (IPDI), hexamethylene diisocyanate, and saturated diphenylmethane diisocyanate (MDI).

The polyols of the invention are compounds having two or more reactive hydrogen moieties. The polyols include polyether polyols and polyester polyols, with polyether polyols being preferred. The polyols generally have a molecular weight in the range of 100 to 7000, preferably in the range of 250 to 6000. In addition, chain extending diols such as 1,6-hexanediol or triols such as trimethylolpropane may also be utilized depending on properties of the coating desired.

Particular polyether polyols which can be used in the invention include Poly G 20-56 diol (Olin Chemical) which is an all propylene oxide based polyol of molecular weight 2000 and OH#56. Also included is Poly G 85-36 triol (Olin Chemical) which is a propylene oxide based polyol of molecular weight 4500 and OH#36 that has been capped with ethylene oxide but still has >60% of its primary OH groups available. Another example is Poly G 76-635 triol (Olin Chemical) which is a propylene oxide based polyol having a molecular weight of about 4500 and an OH# of about 635. Poly G 76-635 has been capped with ethylene oxide but still has >70% of its primary OH groups available.

When making a non-blown polyurethane according to the invention, the ratio of equivalents of isocyanate to hydroxy groups typically ranges from 0.95 to 1.10, more preferably from 1.03 to 1.07. For a blown polyurethane, the ratio of isocyanate to hydroxy groups generally ranges from 1.00 to 1.15, more preferably from 1.05 to 1.10. Formation of urethane bonds prior to addition of catalyst is not recommended, however, prepolymers of polyisocyanate/polyol may be utilized provided the prepolymer is based on aliphatic or cycloaliphatic isocyanates and the prepolymerization reaction is accomplished without the use of a catalyst or curing agent. Prepolymer formation can be accelerated with heat, however, the prepolymer should be cooled to ambient conditions prior to blending with other ingredients. The resultant prepolymer will have a higher initial viscosity than the nonreacted system and the pot life of the spray mixture will be shortened.

The slow reacting polyisocyanates of the invention allow for a polyisocyanate/polyol uniform mixture with an extremely long pot life. For a batch size of 10,000 grams, the pot life of the uniform mixture is preferably greater than 4 hours, more preferably at least 8 hours.

The polyisocyanate and polyol of the invention are low viscosity materials. More particularly, the polyisocyaniate and polyol have a sufficiently low viscosity such that the uniform mixture of those components can be sprayed through a conventional spray gun. By use of a low viscosity polyisocyanate and polyol, the addition of a solvent to the uniform polyisocyanate/polyol mixture is unnecessary.

Generally, the addition of a solvent to the uniform mixture is undesirable since the typical organic solvents added, for example, during blown foam coating of polyurethanes leads to the emission of volatile organic compounds. The present invention can be used as 100%, or near 100%, solids system and thereby eliminates the problem of volatile organic compounds emissions. If necessary, small quantities of organic solvents may be added, usually less than 1% by weight of the complete polyisocyanate/polyol mixture. In certain circumstances, it may be desirable to add reactive diluents to the polyisocyanate/polyol mixture if a thinner polyurethane coating is needed.

The present invention can be applied either to blown or non-blown polyurethane coatings. Blown foams are preferably produced by the presence of water in the polyisocyanate/polyol mixture, and subsequent release of carbon dioxide.

A suitable catalyst is preferably added to accelerate the reaction between the polyisocyanate and polyol. Catalyst is added after the formation of a uniform polyisocyanate/polyol mixture. Preferably, the catalyst is injected into the spray fan during the spraying of the uniform polyisocyanate/polyol mixture onto the substrate; however, introduction of the catalyst may also occur at the spray head. Catalysts commonly used in the art of urethane formation are organometallic compounds containing bismuth, tin, mercury, zinc or lead. Amine catalysts are also used in the polyurethane art. Particular catalysts useful in the invention include bismuth neodecanoate and dibutyl tin dilaurate.

Other additives may also be included in the polyisocyanate/polyol mixture. For example, although the polyurethane coating of the invention is a low density coating, glass microballoons may be added to further lower the density. Flame retardants, such as zinc borate, phosphorous compounds, aluminum trihydrate, or halogenated organics may be included. Thixotropic agents can be used in the invention, and include Cab-o-sil, Aer-o-sil, clays, and castor bean organic thixotropes. In the case of non-blown foams, moisture scavengers can be included, such as an oxazolidine moisture scavenger. For blown foams a coupling agent, such as an organo-zirconate coupling agent or a suitable emulsifying agent, may be used for facilitating the emulsification of water into the polyol. Other additives typically used with polyurethane formulations may be used as well, including fillers, pigments, process chemicals and foaming agents.

By proper use of the type and concentration of catalyst system and other additives, the cure rate and density of the polyurethane coating can be tailored depending on the particular characteristics desired. The present invention is advantageous in that a durable, low density polyurethane coating can be made which is also a high build coating. Prior to the invention, polyurethane coatings were typically 0.010 inches or less, with a maximum of about 0.10 inches. According to the invention, polyurethane coatings greater than 0.10 inches, and up to 1 inch or thicker, can be made in a single application. Moreover, the polyurethane coating of the invention can be applied as thick as 0.030–0.040 inches on a vertical surface in a single application. The polyurethane coating of the invention will generally have a tack-free cure time ranging from 2 to 8 hours.

The polyurethane coatings according to the invention are low density coatings. Non-blown polyurethane coatings according to the invention generally have a density ranging from about 0.96 to about 3.2 g/cm$^3$, and non-blown syntactic polyurethanes typically have a density ranging from about 0.48 to about 1.4 g/cm$^3$. A density ranging from about 0.19 to about 0.72 g/cm$^3$ is typical for blown polyurethane coatings according to the invention, and blown syntactic polyurethane coatings will generally have a density ranging from 0.24 to about 0.88 g/cm$^3$.

The polyurethane coatings according to the invention also have good durability. Durability is reflected by properties such as Shore A hardness, tensile strength and % elongation at failure. Polyurethane coatings according to the invention generally have a Shore A hardness ranging from about 45 to 84, tensile strength (stress at maximum load) ranging from about 50 to about 1000 psi, and a % elongation at failure ranging from about 50 to about 400%.

Conventional spray systems can be used to apply the polyurethane coating of the invention. For example, a standard polyester "gel coat" type spray system may be used that has a main positive displacement fluid pump that can siphon feed the uniform polyisocyanate/polyol mixture from an open bucket reservoir, or can be pressure fed from a pressure pot. Coupled to the displacement pump is a catalyst slave pump that dispenses the catalyst into the coating stream via an external spray nozzle. Numerous types of spray guns are adaptable to this equipment including conventional air spray, airless, air assisted airless, and HVLP spray guns. In general, the polyurethane coating of the invention can be sprayed through any conventional spray gun that can be modified to accept an external catalyst mix to the spray fan, including automatic versions of the spray gun for integration into robotic spraying applications. Because of the low viscosity of the polyisocyanate/polyol mixture, there is no requirement for heating that material prior to spraying.

EXAMPLE 1

The basic formulation process for the nonblown coating system is as follows:

To a 5 gallon polyethylene bucket add the proper amount of polyols (diols, triols, etc.), then the moisture scavenger, and mix for one minute with a high shear mixer. Next add the polyisocyanate and all of the fillers, flame retardant additives, thixotropes, etc., except for the glass microballoons, and high shear blend this mixture for approximately 45 minutes. The high shear blending uniformly distributes and activates the moisture scavenger. The catalysts and catalyst diluents listed in the formulation are not added to the mixture at this stage but are injected into the spray fan during the coating process. Remove the bucket from the high shear mixer and add the microballoons (if required) to the mixture. The microballoons must be mixed in under low shear conditions to prevent crushing of the spheres. Once the spheres are uniformly dispersed, the mixture is ready for spraying. The formulation process for the blown foam coating is the same as above with the following exception:

Substitute the shearing in of the desired quantity of water into the polyols in place of the moisture scavenger.

Once the formulation is sufficiently mixed it can be transferred to the reservoir of the spray apparatus. The formulation in this state has a very long pot life with only a minimal viscosity increase detected over a 6 hour time span.

For example, a formulation having the following components was prepared:

| * Material Formulation * | | |
|---|---|---|
| Material Components | Weight (g) | Density |
| Poly G 20-56 Diol | 700 | 1.001 |
| Poly G 85-36 Triol | 3200 | 1.022 |
| Poly G 76-635 Triol | 1100 | 1.060 |
| Luxate IM (IPDI) | 2027 | 1.060 |
| Milled Glass Fibers (Owens Corning 731ED 1/32") | 600 | 2.600 |
| Zinc Borate | 1300 | 2.800 |
| Barium Titanate | 100 | 5.800 |
| Aerosil R202 | 200 | 2.200 |
| Pentabromodiphenyloxide DE-60F (Great Lakes Chemical) | 3000 | 1.900 |
| Decabromodiphenyloxide DE-83R | 1500 | 3.300 |
| A20/1000 Glass Microballons (3M) | 200 | 0.230 |
| Zoldine MS-Plus Moisture Scavenger (Angus Chemical, OH# = 89) | 300 300 | 0.872 0.872 |
| Composite Density = 1.315 g/cc (Rule of Mixtures) | | |

| * Formulation Analysis * | | |
|---|---|---|
| Material Components | Weight % | Volume % |
| Poly G 20-56 Diol | 4.934 | 6.484 |
| Poly G 85-36 Triol | 22.558 | 29.032 |
| Poly G 76-635 | 7.754 | 9.622 |
| Luxate IM (IPDI) | 14.160 | 17.571 |
| Milled Glass Fibers | 1.926 | 2.906 |
| Zinc Borate | 9.173 | 4.309 |
| Barium Titanate | 0.706 | 0.160 |
| Aerosil R202 | 1.411 | 0.844 |
| DE-60F | 21.148 | 14.640 |
| DE-83R | 10.584 | 4.218 |
| A20/1000 Glass Microballoons | 1.411 | 8.071 |
| Zoldine MS-Plus | 1.926 | 2.906 |

The viscosity plot for the above formulation is shown in FIG. 1. The viscosity curve was taken using a Brookfield Model DV-III viscometer with an RV-07 spindle and RPM setting of 45 and a temperature of 73 degrees Fahrenheit. The initial torque value on the sample was 59.1 and the mass of the sample was 122.5 grams. Thermoset systems such as this are mass dependent and, therefore, a larger mass sample could generate an exotherm (thus promoting gel of the material). However, the isophorone diisocyanate in the mixture is very slow reacting without catalyst. Since no catalyst is present in the main reservoir the material does not generate a significant exotherm and large masses of the mixture can be handled for up to 8 hours. At least approximately 36000 grams or about 10 gallons of material can be introduced into the spray reservoir at one time. In normal operation mode a 10 gallon quantity of material would at a maximum be dispensed within a 4 hour time frame.

EXAMPLE 2

The following is a non-blown polyurethane according to the invention:

| * Material Formulation * | | |
|---|---|---|
| Material Components | Weight (g) | Density |
| Poly G 20-56 Diol | 900 | 1.001 |
| Poly G 85-36 Triol | 3000 | 1.022 |
| Poly G 76-635 Triol | 1100 | 1.080 |
| Luxate IM (IPDI) | 2035 | 1.060 |
| Milled Glass Fibers (731ED) | 600 | 2.600 |
| Zinc Borate | 1000 | 2.800 |
| Decabromodiphenyloxide DE-83R | 3000 | 3.300 |
| Zoldine MS Plus Moisture Scavenger | 300 | 0.872 |
| Bismuth Neodecanoate 3% (v/v) | 260 | 1.100 |
| Toluene (Bismuth Diluent) 1% (v/v) | 86 | 0.860 |
| Composite Density = 1.386 g/cc (Rule of Mixtures) | | |

| * Formulation Analysis * | | |
|---|---|---|
| Material Components | Weight % | Volume % |
| Poly G 20-56 Diol | 7.541 | 10.438 |
| Poly G 85-36 Triol | 25.136 | 34.078 |
| Poly G 76-635 Triol | 9.217 | 11.824 |
| Luxate IM (IPDI) | 17.051 | 22.287 |
| Milled Glass Fibers | 5.027 | 2.679 |
| Zinc Borate | 8.379 | 4.146 |
| DE-83R | 25.136 | 10.554 |
| Zoldine MS Plus | 2.514 | 3.994 |

The spray density is ~90% of theoretical density, or ~1.25 g/cc.

EXAMPLE 3

The following is a non-blown polyurethane according to the invention in which microballoons have been added to further lower the density:

| * Material Formulation * | | |
|---|---|---|
| Material Components | Weight (g) | Density |
| Poly G 20-56 Diol | 900 | 1.001 |
| Poly G 85-36 Triol | 3000 | 1.022 |
| Poly G 76-635 Triol | 1100 | 1.080 |
| Luxate IM (IPDI) | 2035 | 1.060 |
| Milled Glass Fibers (731ED) | 500 | 2.600 |
| A20/1000 Glass Microballoons | 950 | 0.230 |
| Pentabromodiphenyloxide DE-60F | 2500 | 1.900 |
| Zoldine MS Plus Moisture Scavenger | 300 | 0.872 |
| Bismuth Neodecanoate 3% (v/v) | 380 | 1.100 |
| Toluene (Bismuth Diluent) 1% (v/v) | 127.5 | 0.860 |
| Composite Density = 0.885 g/cc (Rule of Mixtures) | | |

| * Formulation Analysis * | | |
|---|---|---|
| Material Components | Weight % | Volume % |
| Poly G 20-56 Diol | 7.975 | 7.049 |
| Poly G 85-36 Triol | 26.584 | 23.013 |
| Poly G 76-635 Triol | 9.747 | 7.985 |
| Luxate IM (IPDI) | 18.033 | 15.051 |
| Milled Glass Fibers | 4.431 | 1.508 |
| A20/1000 Glass Microballoons | 8.418 | 32.382 |
| DE-60F | 22.153 | 10.316 |
| Zoldine MS Plus | 2.658 | 2.697 |

The spray density is ~90% of theoretical density, or ~0.8 g/cc.

EXAMPLE 4

The following is a blown polyurethane foam according to the invention:

| * Material Formulation * | | |
|---|---|---|
| Material Components | Weight (g) | Density |
| Poly G 20-56 Diol | 400.000 | 1.001 |
| Poly G 85-36 Triol | 3200.000 | 1.022 |
| Poly G 76-635 Triol | 1400.000 | 1.080 |

| -continued | | |
|---|---|---|
| Luxate IM (IPDI) | 2340.000 | 1.060 |
| Milled Glass Fibers (731ED) | 500.000 | 2.600 |
| Zina Borate | 1000.000 | 2.800 |
| Decabromodiphenyloxide DE-83R | 5000.000 | 3.300 |
| Water | 6.000 | 1.000 |
| Metacure T-12 Tin Catalyst 1.5% (v/v) (Air Products) | 135.000 | 1.060 |
| Diaza-bicyclo-undecene (DBU) Catalyst 1.5% (v/v) (Air Produats) | 130.000 | 1.020 |
| Toluene (Catalyst Diluent) 1.0% (v/v) | 90.000 | 0.000 |
| Composite Density = 1.521 g/cc (Rule of Mixtures) | | |

| * Formulation Anaiysis * | | |
|---|---|---|
| Material Components | Weight % | Volume % |
| Poly G 20-56 Diol | 8.26067 | 10.56666 |
| Poly G 85-36 Triol | 27.53557 | 34.49846 |
| Poly G 76-635 Triol | 10.09637 | 11.97011 |
| Luxate IM (IPDI) | 16.93437 | 20.45596 |
| Milled Glass Fibers | 4.58926 | 2.26009 |
| Zinc Borate | 9.17852 | 4.19731 |
| DE-83R | 22.94631 | 15.46378 |
| Water | 0.45893 | 0.58762 |
| The estimated blowing factor is 3.5x, therefore, the spray coating density is approximately 0.437 g/cc. | | |

We claim:

1. A method for producing a durable, low density, high build polyurethane coating comprising:
   (a) mixing at least one polyol and at least one polyisocyanate so as to provide a uniform mixture in which the polyol and polyisocyanate have not substantially reacted to form a urethane and which has sufficiently low viscosity such that the mixture is capable of being sprayed,
   (b) introducing a catalytically effective amount of at least one polyurethane catalyst into the uniform mixture, and
   (c) spraying the mixture onto a substrate so as to form a durable, low density, high build polyurethane coating thereon.

2. The method according to claim 1 wherein the catalyst introduction of step (b) is performed prior to the spraying of step (c).

3. The method according to claim 1 wherein the catalyst introduction of step (b) is performed during the spraying of step (c).

4. The method according to claim 3 wherein step (c) comprises the use of a spray head and a spray fan external to said spray head, and the catalyst is introduced into the mixture at the spray head.

5. The method according to claim 3 wherein step (c) comprises the use of a spray head and a spray fan external to said spray head, and the catalyst is introduced into the mixture at the spray fan.

6. The method according to claim 1 wherein step (a) further comprises the addition of an effective amount of water so as to provide, upon reaction, a blowing agent.

7. The method according to claim 1 wherein step (a) further comprises the addition of a thixotropic agent.

8. The method according to claim 1 wherein step (a) further comprises the addition of a coupling agent.

9. The method according to claim 1 wherein the catalyst is an organometallic catalyst, an amine catalyst, or mixtures thereof.

10. The method according to claim 1 wherein the catalyst is introduced in an amount effective to cure the coating in a period of time not greater than 1 hour.

11. The method according to claim 1 wherein the polyol is selected from among polyether polyols or polyester polyols.

12. The method according to claim 1 wherein the isocyanate is selected from among isophorone diisocyanate, hexamethylene diisocyanate or saturated diphenylmethane diisocyanate.

13. The method according to claim 1 wherein the uniform mixture in step (a) has a pot life greater than 4 hours at a batch size greater than 10 kg.

14. The method according to claim 1 wherein the uniform mixture in step (a) has a pot life greater than 8 hours at a batch size greater than 10 kg.

15. A durable, low density, high build polyurethane coating made according to the method of claim 1.

16. The method according to claim 1, wherein part (c) the polyurethane coating has a Shore A hardness ranging from about 45 to 84, tensile strength ranging from about 50 to about 1000 psi, and a % elongation at failure ranging from about 50 to about 400%.

17. The method according to claim 1, wherein part (c) the polyurethane coaling has a density ranging from about 0.96 to about 3.2 g/cm$^3$.

18. The method according to claim 1, wherein part (c) the polyurethane coating has a density ranging from about 0.48 to about 1.4 g/cm$^3$.

19. The method according to claim 1, wherein part (c) the polyurethane coating has a density ranging from about 0.19 to about 0.72 g/cm$^3$.

20. The method according to claim 1, wherein part (c) the polyurethane coating has a density ranging from about 0.24 to about 0.88 g/cm$^3$.

* * * * *

UNITED STATES PATENT AND TRADEMARK OFFICE
CERTIFICATE OF CORRECTION

PATENT NO. : 6,084,001
DATED : July 4, 2000
INVENTOR(S) : James E. Forman et al.

It is certified that error appears in the above-identified patent and that said Letters Patent is hereby corrected as shown below:

Column 8, claim 17,
Line 39, amend "coaling" to -- coating --.

Signed and Sealed this

Fifth Day of February, 2002

Attest:

Attesting Officer

JAMES E. ROGAN
*Director of the United States Patent and Trademark Office*